United States Patent
Sobolevskiy et al.

(10) Patent No.: US 7,390,471 B2
(45) Date of Patent: Jun. 24, 2008

(54) APPARATUS AND METHOD FOR CATALYTIC TREATMENT OF EXHAUST GASES

(75) Inventors: Anatoly Sobolevskiy, Orlando, FL (US); Joseph A. Rossin, Columbus, OH (US)

(73) Assignee: Siemens Power Generation, Inc., Orlando, FL (US)

( * ) Notice: Subject to any disclaimer, the term of this patent is extended or adjusted under 35 U.S.C. 154(b) by 331 days.

(21) Appl. No.: 11/282,036

(22) Filed: Nov. 17, 2005

(65) Prior Publication Data

US 2007/0110643 A1    May 17, 2007

(51) Int. Cl.
B01D 53/56 (2006.01)
B01D 53/62 (2006.01)
B01D 53/72 (2006.01)
F01N 3/10 (2006.01)
F23J 15/00 (2006.01)

(52) U.S. Cl. .................. 423/237; 423/239.1; 423/245.3; 423/247; 422/168; 422/169; 422/170; 422/171; 422/172; 422/177; 422/180; 422/187; 60/39.01; 60/39.5; 60/685

(58) Field of Classification Search .................. 423/237, 423/239.1, 245.3, 247; 422/168, 169, 170, 422/171, 172, 177, 180, 187; 60/39.01, 39.5, 60/685

See application file for complete search history.

(56) References Cited

U.S. PATENT DOCUMENTS

| | | | |
|---|---|---|---|
| 3,929,965 A * | 12/1975 | Kim et al. | 423/213.5 |
| 4,046,888 A | 9/1977 | Maeshima et al. | |
| 4,155,986 A | 5/1979 | Gladden | |
| 4,225,462 A | 9/1980 | Umemura et al. | |
| 4,233,185 A | 11/1980 | Knapton et al. | |
| 4,978,514 A | 12/1990 | Hofmann et al. | |
| 5,139,754 A | 8/1992 | Luftglass et al. | |
| 5,298,230 A | 3/1994 | Argabright et al. | |
| 5,510,092 A | 4/1996 | Mansour et al. | |
| 5,516,497 A | 5/1996 | Speronello et al. | |
| 5,589,142 A | 12/1996 | Gribbon | |
| 5,591,414 A | 1/1997 | Jacob et al. | |
| 5,720,931 A | 2/1998 | Rossin et al. | |
| 5,851,950 A | 12/1998 | Rossin et al. | |
| 5,891,409 A | 4/1999 | Hsiao et al. | |

(Continued)

OTHER PUBLICATIONS

R. Litto, R.E. Hayes and B. Liu; "Catalytic Combustion for Reduction of Fugitive Methane Emissions from Natural Gas Compressor Station"; Proceedings of the 7th International Conference on Greenhouse Gas Control Technologies; Sep. 5, 2004; pp. 329-336; Vancouver, Canada.

*Primary Examiner*—Timothy C Vanoy

(57) ABSTRACT

An exhaust gas treatment apparatus (20) for reducing the concentration of $NO_x$, HC and CO in an exhaust gas stream (18) such as produced by a gas turbine engine (12) of a power generating station (10). The treatment apparatus includes a multifunction catalytic element (26) having an upstream reducing-only portion (28) and a downstream reducing-plus-oxidizing portion (30) that is located downstream of an ammonia injection apparatus (24). The selective catalytic reduction (SCR) of $NO_x$ is promoted in the upstream portion of the catalytic element by the injection of ammonia in excess of the stoichiometric concentration, with the resulting ammonia slip being oxidized in the downstream portion of the catalytic element. Any additional $NO_x$ generated by the oxidation of the ammonia is further reduced in the downstream portion before being passed to the atmosphere (22).

22 Claims, 2 Drawing Sheets

U.S. PATENT DOCUMENTS

| | | |
|---|---|---|
| 6,126,912 A | 10/2000 | Bourges et al. |
| 6,417,133 B1 | 7/2002 | Ebner et al. |
| 6,442,932 B1 | 9/2002 | Hofmann et al. |
| 6,444,177 B1 | 9/2002 | Muller et al. |
| 6,521,559 B1 | 2/2003 | Long et al. |
| 6,713,031 B2 | 3/2004 | Harris et al. |
| 6,843,971 B2 | 1/2005 | Schafer-Sindlinger et al. |
| 2003/0014194 A1 | 1/2003 | Fischer |

* cited by examiner

| Type of Catalytic Process | NOx Concentration, ppm | | NH3 Concentration, ppm | | NOx Removal Efficiency, % | NH3 Destruction Efficiency, % |
|---|---|---|---|---|---|---|
| | Inlet | Outlet | Inlet | Outlet | | |
| SCR Reduction Only | 60.0 | 3.1 | 66.0 | 8.3 | 94.8 | 8.8 |
| SCR Reduction + Oxidizing Process | 64.0 | 2.8 | 71.0 | 1.9 | 95.6 | 80.6 |

| Tem-re °C | Split, % | NH$_3$/NOx Molar Ratio | SCR GHSV, hr$^{-1}$ | Emissions, ppmw @ 15% O$_2$ ||||||||| % Removal Efficiency ||||
|---|---|---|---|---|---|---|---|---|---|---|---|---|---|---|
| | | | | NOx IN | NOx OUT | NH$_3$ OUT | CO IN | CO OUT | Toluene IN | Toluene OUT | NOx | CO | Toluene | NH$_3$ |
| 305 | 60/40 | 1.10 | 15,000 | 28.3 | 1.8 | 0.98 | 9.4 | 0.8 | 5.2 | 0.7 | 95.2 | 91.6 | 86.5 | 77.3 |
| 304 | 60/40 | 1.08 | 15,000 | 27.9 | 1.6 | 0.91 | 42.5 | 3.1 | 5.5 | 0.7 | 94.5 | 92.7 | 87.3 | 79.6 |
| 323 | 60/40 | 1.11 | 15,000 | 26.1 | 1.5 | 0.95 | 8.3 | 0.7 | 5.7 | 0.7 | 94.0 | 92.2 | 87.7 | 78.6 |
| 323 | 60/40 | 1.12 | 15,000 | 26.1 | 2 | 0.84 | 38.9 | 2.0 | 7.0 | 0.8 | 92.6 | 94.8 | 88.6 | 84.7 |
| 323 | 50/50 | 1.05 | 20,000 | 44.1 | 2.9 | 1.1 | 5.0 | 0.5 | | | 93.2 | 90.0 | | 83.3 |
| 334 | 60/40 | 1.12 | 15,000 | 28.2 | 1.9 | 1.35 | 8.4 | 0.6 | 4.9 | 0.6 | 93.7 | 92.3 | 87.8 | 76.7 |
| 334 | 60/40 | 1.10 | 15,000 | 28.2 | 2.1 | 1.36 | 38.4 | 1.9 | 5.0 | 0.6 | 92.9 | 95.0 | 88.0 | 76.8 |
| 332 | 60/40 | 1.09 | 20,000 | 26.1 | 2.5 | 1.2 | 9.1 | 0.8 | 4.5 | 0.5 | 90.6 | 90.6 | 88.9 | 76.8 |
| 341 | 50/50 | 1.15 | 15,000 | 42 | 1.2 | 1.1 | 4.5 | 0.4 | | | 97.3 | 91.1 | | 88.9 |
| 340 | 60/40 | 1.11 | 20,000 | 34.9 | 2.2 | 1.2 | 9.1 | 0.6 | | | 93.4 | 93.8 | | 75.6 |

FIG. 3

APPARATUS AND METHOD FOR CATALYTIC TREATMENT OF EXHAUST GASES

FIELD OF THE INVENTION

This invention relates generally to the treatment of a gas stream containing nitrogen oxides, for example but not limited to the gases produced by the combustion of a fossil fuel, wherein the gas stream may also contain hydrocarbons, carbon monoxide and/or ammonia.

BACKGROUND OF THE INVENTION

The control of undesirable emissions such as oxides of nitrogen ($NO_x$), hydrocarbons (HC) including volatile organic compounds (VOC), and carbon monoxide (CO) that are generated by power producers such as automobiles and electrical power generating stations is a well-studied field. The Background section of U.S. Pat. No. 5,891,409 provides a useful summary of the conditions and chemistries that produce such emissions and the approaches used to limit the release of these pollutants to the environment.

One technology for the control of oxides of nitrogen that is currently being used commercially at large land-based electrical power generating stations is selective catalytic reduction (SCR). The flue gases from a power station have a net oxidizing effect due to the high proportion of oxygen that is provided to ensure adequate combustion of the hydrocarbon fuel. Thus, the oxides of nitrogen that are present in the flue gas can be reduced to nitrogen and water only with great difficulty. This problem is solved by selective catalytic reduction wherein the flue gas is mixed with anhydrous ammonia and is passed over a suitable reduction catalyst at temperatures between about 150-550° C., and preferably between 300-550° C., prior to being released into the atmosphere. The ammonia is not a natural part of the combustion exhaust stream, but rather, it is injected into the exhaust stream upstream of the catalyst element for the specific purpose of supporting one or more of the following reduction reactions:

  (1)

  (2)

  (3)

  (4)

Reducing agents other than ammonia, such as for example hydrazine, methyl hydrazine, monomethyl amine, and urea, or mixtures thereof, or mixtures thereof with ammonia, may also be employed in the processes described herein.

It is also known to combine an SCR process with a catalytic oxidizing process to treat an exhaust gas flow by oxidizing carbon monoxide to carbon dioxide and by oxidizing hydrocarbons to carbon dioxide and water. The oxidizing process is typically located upstream of the ammonia injection location and upstream of the reducing catalyst because the oxidizing catalyst will also function to oxidize ammonia, which is undesirable when it decreases the amount of ammonia available for reduction of the $NO_x$ and because it produces additional $NO_x$ compounds. U.S. Pat. No. 5,589,142 describes an emissions abatement system where an emission steam is passed sequentially through a first oxidizing catalyst, an ammonia injection location, a reducing catalyst, and then a second oxidizing catalyst. In this process, the amount of ammonia that is injected is controlled as a function of the $NO_x$ concentration and is specifically limited to a stoichiometric value. Thus, no excess ammonia is present in the emission stream as it leaves the reducing catalyst and there is no concern about generating additional $NO_x$ compounds in the trailing second oxidizing catalyst.

Modern air quality regulations mandate continuingly reduced emission levels for power generating plants, while at the same time fuel efficiency requirements continue to increase. Combustion controls alone may prove inadequate to satisfy these often-conflicting goals, and thus continued the improvement of post-combustion exhaust gas treatment systems is desired.

BRIEF DESCRIPTION OF THE DRAWINGS

The invention is explained in following description in view of the following drawings:

FIG. 3 is a table summarizing exemplary results of catalyst testing at a natural gas fired pilot plant with a reducing-plus-oxidizing catalytic process.

DETAILED DESCRIPTION OF THE INVENTION

Figures 1, 2:
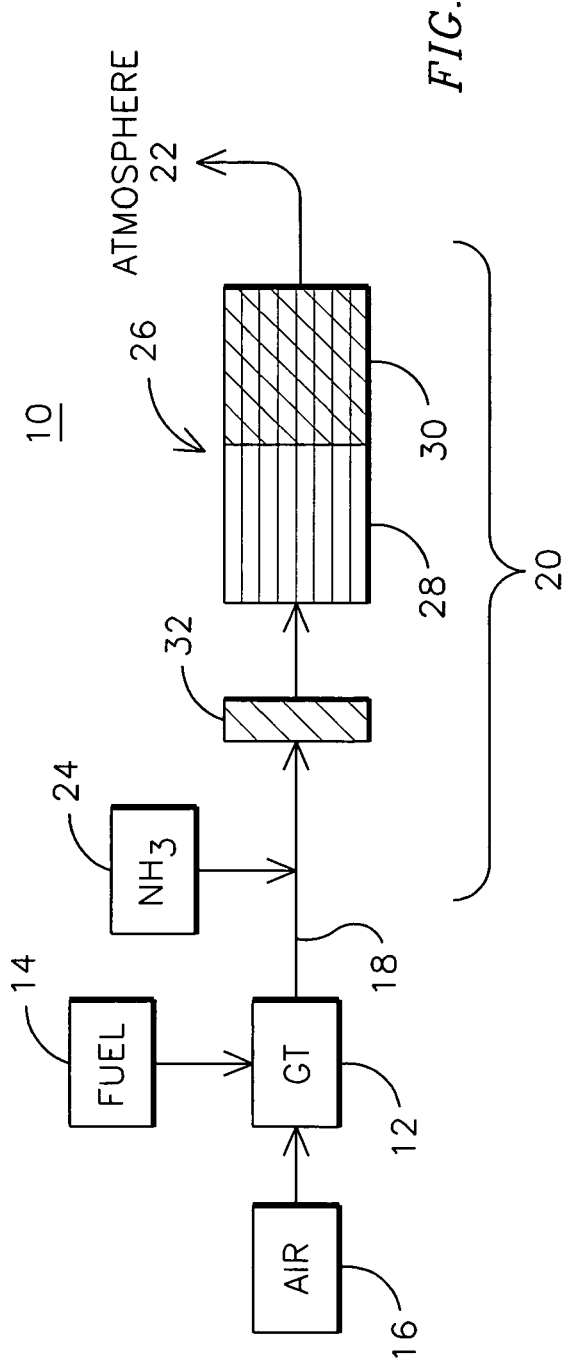
FIG. 1 is a schematic illustration of a power generating plant incorporating an improved exhaust gas treatment system.
FIG. 2 is a table comparing the performance of a reducing only catalytic process with a reducing-plus-oxidizing catalytic process.

The present inventors have developed a process for the post-combustion catalytic treatment of exhaust gases that is useful in power generation applications to reduce the concentrations of oxides of nitrogen, hydrocarbons (including oxygenated hydrocarbons, such as for example aldehydes) and carbon monoxide to sub-2 ppm levels, while at the same time limiting the amount of ammonia injection that is necessary to support the incorporated SCR process and also maintaining ammonia slip to the atmosphere to below 2 ppm.

FIG. 1 is a schematic illustration of one embodiment of the present invention for a power generating plant 10 including a gas turbine engine 12 wherein energy is produced by the combustion of a hydrocarbon fuel 14 in air 16 to produce shaft power and resulting in a flow of exhaust gases 18 containing undesirably high concentrations of $NO_x$, hydrocarbon and CO pollutants. The power generating plant 10 includes a post-combustion treatment apparatus 20 for reducing the concentration of the pollutants prior to the release of the exhaust gas to the atmosphere 22. The treatment apparatus 20 incorporates an ammonia injection apparatus 24 and a multifunction catalytic element 26 located downstream of the ammonia injection apparatus 24 relative to the flow of exhaust gases 18. The catalytic element 26 includes a reducing-only portion 28 and a combined reducing-plus-oxidizing portion 30 located downstream of the reducing-only portion 14.

During operation of the power plant 10, the ammonia injection apparatus 24 and reducing-only portion 28 of the catalytic element 26 will function together for the selective catalytic reduction of the oxides of nitrogen present in the flow of exhaust gases 18, such as described by Equations 1 through 4 above. The SCR catalyst may be any catalytic material designed to facilitate a reaction between $NH_3$ and $NO_x$ such as to form $N_2$. Catalysts may include but are not limited to $V/TiO_2$ based materials and zeolite based materials. The catalyst material(s) selected for the reducing-only portion 28 may be any appropriate material known in the art, such as titanium dioxide and at least one oxide of tungsten, vanadium, molybdenum, silicon, aluminum, iron, titania-zirconia, magnesium, manganese or yttrium, or their mixtures, for example. Other additives, such as for example sulfate, lanthanum, barium, zirconium, may also be present. One such composition is titanium oxide with 1-5% $V_2O_5$, 0-10% $WO_3$, and 0-10% $MoO_3$. The percentages expressed herein are weight percentages unless otherwise indicated. Zeolite materials include acidified forms of zeolite ZSM-5, zeolite beta, mortenite, and faujasite; promoted with small amounts of base metals, such as for example iron, cobalt and nickel.

The reducing-plus-oxidizing portion 30 contains material(s) that support the reduction reactions of Equations 1 through 4 as well as material(s) that support one or more of the following oxidizing reactions:

$$CO + O_2 \rightarrow CO_2 \tag{5}$$

$$C_aH_bO_y + (a+b/4-y/2)O_2 \rightarrow aCO_2 + b/2H_2O \tag{6}$$

$$4NH_3 + 7O_2 \rightarrow 4NO_2 + 6H_2O \tag{7}$$

$$4NH_3 + 5O_2 \rightarrow 4NO + 6H_2O \tag{8}$$

$$2NH_3 + 2O_2 \rightarrow N_2O + 3H_2O \tag{9}$$

$$4NH_3 + 3O_2 \rightarrow 2N_2 + 6H_2O \tag{10}$$

The reducing-plus-oxidizing portion 30 preferably supports reaction 10 in favor of reactions 7 through 9, as will be discussed further below, in order to minimize the production of additional quantities of $NO_x$. Thus, the oxidizing catalyst material is able to decompose $NH_3$ to primarily $N_2$. Typical oxidizing catalyst materials include transition metals of groups 6B, 8B and 9, and preferably include copper, platinum, palladium, chrome, iron, nickel, rhodium, gold, silver, ruthenium and mixtures thereof, although the present invention is not limited to any particular oxidizing or reducing catalytic material. Any known form of catalyst structure may be used, such as pellets, granules, cylinders or a monolithic structure. The reducing-only portion 28 and the reducing-plus-oxidizing portion 30 may be formed as a monolithic structure, or the two portions may be formed separately.

The post combustion treatment apparatus 20 allows the selective catalytic reduction process to be operated with an excess of ammonia that is beyond the stoichiometric concentration. This is advantageous because it has been observed that the efficiency of the reduction reaction decreases as the level of $NO_x$ removal exceeds 90+%, thereby making it difficult to achieve sub-2 ppm $NO_x$ levels by injecting only a stoichiometric quantity of ammonia. A ratio of $NH_3:NO_x$ of about 1.05:1 to about 2:1, or preferably about 1.05:1 to about 1.2:1 may be used in certain embodiments to achieve the desired level of $NO_x$ reduction. Such excess ammonia levels would normally result in ammonia slip of greater than about 5-15 ppm in prior art SCR processes, and any use of a downstream oxidizing catalyst to decrease the concentration of ammonia in the slip would result in an increase in the $NO_x$ levels using prior art systems due to the oxidation of $NH_3$ to $NO_x$. The present inventors have solved this dilemma by providing a multifunction catalytic element 26 that includes both reducing and oxidizing functions at its downstream portion 30. This novel concept allows the excess ammonia to be decomposed after completion of the primary $NO_x$ reduction function, while at the same time providing a continuing reduction capability for further reacting with the additional $NO_x$ that is produced as a result of the oxidation of the excess ammonia.

In addition to decomposing the excess ammonia introduced into the exhaust gas stream 18, the oxidizing function of the reducing-plus-oxidizing portion 30 also serves to decrease CO and HC pollutants to a desired low level. Prior art systems that oxidize CO and HC pollutants upstream of the SCR process create a need for the injection of additional amounts of ammonia because the oxidation process also converts up to 65% of the NO that passes through the oxidation catalyst into $NO_2$, and it is known that a higher molar ratio of ammonia is required to reduce $NO_2$ than to reduce NO in a downstream SCR process (equation 3). Advantageously, the present treatment apparatus 20 avoids this problem by performing the oxidation process downstream of the SCR process. Thus, the present invention decreases the amount of ammonia that is needed to reduce the $NO_x$ that is produced by the gas turbine engine 12 when compared to a prior art process having an oxidizing catalyst followed by an SCR process.

Advantageously, the selectivity of the oxidizing catalyst to produce water and nitrogen from ammonia (equation 10) rather than producing water and an oxide of nitrogen (equations 7-9) is higher in the presence of the reduction catalyst than it is when the oxidizing catalyst is functioning alone. It is known that NO is a main product of the catalytic oxidizing of ammonia on a traditional CO catalyst that contains platinum or palladium. These metals are commonly used for CO and VOC oxidation in the flue gases from power generation stations. The combination of an oxidizing catalyst (for example Pt/Pd) with a reducing catalyst dramatically increases the selectivity of the ammonia decomposition process toward nitrogen formation. As a result, ammonia reduction during this improved process is not accompanied by elevated NOx emissions when compared with the SCR-only process, as illustrated in the comparison table of FIG. 2. Thus, the synergy provided by the reducing-plus-oxidizing portion 30 of the multifunction catalyst 26 serves to further reduce the levels of $NO_x$ released to the atmosphere 22.

Optionally, a low level of oxidizing catalyst function (e.g. lower than in the reducing-plus-oxidizing portion) may be provided upstream of the multifunction catalyst element 26. This oxidizing function may be provided as a discrete oxidizing catalyst 32, or by impregnating the upstream portion 28 of the multifunction catalyst element 26 with a small amount of oxidizing material, for example between 0.001-3 wt. % of the catalyst or preferably between 0.01-1 wt. % of the catalyst. This concentration is comparatively lower than between 0.01-15 wt. % of the catalyst or preferably between 0.1-5 wt. % of the catalyst that may be used in the downstream reducing-plus-oxidizing portion. This configuration will enhance the CO and hydrocarbon oxidation activity of the process, but will require that the process be operated at a slightly greater $NH_3$ to $NO_x$ ratio, as a small portion of the ammonia will be decomposed prior to being involved in the reducing reactions.

The types, volumes and structure of the catalytic materials of the multifunction catalytic element 26 may vary depending upon the requirements of a particular application. The reducing catalyst material may be identical between the reducing-only portion 28 and the reducing-plus-oxidizing portion 30, or they may be different materials. The reducing-only portion of the multi-function catalyst may be in the range of 10-90% of the total catalyst volume, with one embodiment having the reducing-only portion being 60% of the total catalyst volume and the reducing-plus-oxidizing portion being 40% of the total catalyst volume.

Exemplary results of catalyst testing at a natural gas fired pilot plant are illustrated in the table of FIG. 3. The catalyst used was a monolithic catalyst with a density of 200 cells per square inch (CPSI). The catalyst dimensions were 150 mm by 150 mm by 300 mm. The $NH_3/NOx$ molar ratio was 1.05-

1.15. The split of the total catalyst volume between reducing-only and reducing-plus-oxidizing portions was either 60%/40% or 50%/50% respectively, as indicated in the figure. The reduction-only catalyst included 1.7 wt. % of vanadium/$TiO_2$ and the reduction-plus-oxidizing catalyst included a reduction catalyst having 1.7 wt % of vanadium/$TiO_2$ impregnated with 2.8 g/ft$^3$ each of platinum and palladium.

Several examples of the advantageous performance of the present invention are discussed in the following paragraphs; however, it is first be instructive to examine the performance of a prior art reducing-only catalyst. For such comparisons, consider a 5% V/$TiO_2$ wash-coated monolith exposed to a process stream comprising 410 ppm toluene, 10% $O_2$, 2.5% $H_2O$, with the balance being $N_2$ at a gas hourly space velocity (GHSV) of 18,000. At a temperature of 380° C., the conversion of toluene through this catalyst is less than 5%. For the same reducing catalyst exposed to a process stream comprising 410 ppm CO, 10% $O_2$, 2.5% $H_2O$, and the balance $N_2$ at a GHSV of 18,000, the conversion of CO at a temperature of 380° C. is less than 5%. Finally, for the same catalyst exposed to a process stream comprising 100 ppm $NH_3$, 10% $O_2$, 2.5% $H_2O$, and the balance $N_2$ at a GHSV of 18,000, at a temperature of 370° C., the conversion of $NH_3$ is 36%, at 350° C., the conversion of $NH_3$ is 20%, and at 330° C. the conversion of $NH_3$ is less than 10%.

Considering now an embodiment of the present invention, a layered bed catalyst configuration consisting of a reducing-only portion and a reducing-plus-oxidizing portion was evaluated for its ability to treat $NO_x$ containing emissions streams. The wash-coated monolithic catalyst employed in the reducing-plus-oxidizing portion (50%) consisted of 0.1% Pt/0.1% Pd impregnated onto an SCR catalyst, where the SCR catalyst consisted of 2.7% V/2% $FeSO_4$/$TiO_2$ in both portions. The catalyst was exposed to a process stream consisting of 30 ppm $NO_x$, between 30 and 45 ppm $NH_3$, 10% $O^2$, 3.5% $H_2O$, balance $N_2$ at 305° C. and a GHSV of 20,000. The Table 1 below reports the $NO_x$ reduction efficiency and $NH_3$ slip for varying $NH_3$ feed concentrations. The ammonia conversion refers to the conversion of the excess $NH_3$; that is to say the conversion of the fraction of ammonia that is not converted to $N_2$ by reactions involving $NO_x$.

TABLE 1

| $NH_3$ Feed Concentration | NOx Reduction Efficiency | Conversion of Excess $NH_3$ |
| --- | --- | --- |
| 45 ppm | 99.0% | 84.6% |
| 40 ppm | 98.9% | 87.5% |
| 35 ppm | 97.2% | 96.7% |
| 30 ppm | 91.2% | >99% |

These results demonstrate that the process/apparatus described herein is capable of operating over a wide range of $NH_3$ to $NO_x$ ratios.

The catalyst configuration described above was evaluated for its ability to reduce NOx emissions over temperatures between 370° C. and 230° C. The catalyst configuration was exposed to a process stream consisting of 30 ppm NO, 40 ppm $NH_3$, 10% $O^2$, 3.5% $H_2O$, balance $N_2$ at a GHSV of 20,000. Table 2 reports the $NO_x$ reduction efficiency and $NH_3$ conversion as a function of temperature.

TABLE 2

| Temperature, ° C. | NOx Reduction Efficiency | Conversion of Excess $NH_3$ |
| --- | --- | --- |
| 372° C. | 93% | 98% |
| 355° C. | 94% | 99% |
| 338° C. | 96% | 99% |
| 321° C. | 98% | 99% |
| 304° C. | 99% | 88% |
| 286° C. | 99% | 66% |
| 270° C. | 99% | 19% |
| 255° C. | 99% | 11% |
| 230° C. | 99% | 7% |

The catalyst configuration described above was evaluated for its ability to decompose 93 ppm acetaldehyde at a GHSV of 20,000 in a process stream comprising 10% $O_2$, 3.5% $H_2O$ balance $N_2$. Results are presented in Table 3.

TABLE 3

| Temperature, ° C. | Acetaldehyde Conversion, % |
| --- | --- |
| 370° C. | >99% |
| 330° C. | >99% |
| 310° C. | >99% |
| 290° C. | >99% |
| 260° C. | 80.2% |

The catalyst configuration described above was evaluated for its ability to decompose 160 ppm toluene at a GHSV of 20,000 in a process stream comprising 10% $O_2$, 3.5% $H_2O$ balance $N_2$. Results are presented in Table 4.

TABLE 4

| Temperature, ° C. | Toluene Conversion, % |
| --- | --- |
| 300° C. | 99.4% |
| 290° C. | 99.3% |
| 275° C. | 98.8% |
| 260° C. | 96.9% |
| 245° C. | 87.3% |

The catalyst configuration described above was evaluated for its ability to decompose 500 ppm CO at a GHSV of 20,000 in a process stream comprising 10% $O_2$, 3.5% $H_2O$ balance $N_2$. Results are presented in Table 5.

TABLE 5

| Temperature, ° C. | CO Conversion, % |
| --- | --- |
| 255° C. | 99.2% |
| 235° C. | 98.3% |
| 215° C. | 97.7% |
| 190° C. | 97.4% |
| 165° C. | 96.1% |
| 145° C. | 92.0% |
| 125° C. | 77.5% |

For CO, toluene and acetaldehyde, carbon dioxide was the only carbon-containing reaction product detected in the effluent stream.

In a further example, a wash-coated reducing-plus-oxidizing monolith (200 cells/in$^2$) comprising 1% Pd/3% Cu/0.1% Pt/5% V/$TiO_2$ was evaluated for its ability to decompose NH3 with minimal $NO_x$ formation. The catalyst was exposed to a process stream comprising 100 ppm $NH_3$, 10% $O^2$, 2.5%

$H_2O$, and the balance $N_2$ at a GHSV of 18,000. The ammonia conversion and concentration of NOx in the process effluent stream is reported in Table 6.

TABLE 6

| Temperature | [NO$_x$], ppm | NH$_3$ Conversion |
|---|---|---|
| 340° C. | 3.74 ppm | 99.2% |
| 320° C. | 1.16 ppm | 95.1% |
| 295° C. | 0.48 ppm | 47.5% |

These results demonstrate the ability of the multifunction reducing-plus-oxidizing catalyst to decompose $NH_3$ with minimal $NO_x$ formation.

In a further example, a wash-coated monolith (200 cells/in$^2$) comprising 3% Cr/3% Cu/0.2% Pt/5% V/TiO$_2$ was evaluated for its ability to decompose $NH_3$ with minimal $NO_x$ formation. The catalyst was exposed to a process stream comprising 100 ppm $NH_3$, 10% $O_2$, 2.5% $H_2O$, and the balance $N_2$ at a GHSV of 18,000. The ammonia conversion and concentration of NOx in the process stream are reported in Table 7.

TABLE 7

| Temperature | [NO$_x$], ppm | NH$_3$ Conversion |
|---|---|---|
| 365° C. | <0.5 ppm | >99% |
| 335° C. | <0.5 ppm | >99% |
| 310° C. | <0.5 ppm | >99% |
| 290° C. | <0.5 ppm | >99% |

These results further demonstrate the ability of the multifunction reducing-plus-oxidizing catalyst to decompose $NH_3$ with minimal $NO_x$ formation.

In a final example, a monolithic layered bed catalyst configuration consisting of a 2.5% V/TiO$_2$ inlet layer upstream of a 3.5% Cu/0.7% Pd/2.5% V/TiO$_2$ outlet layer was exposed to an emissions stream consisting of 300 ppm NO, 350 ppm $NH_3$ at 330° C. and a GHSV of 9,000. The inlet layer and outlet layer were each 50% of the total catalyst volume. At these process conditions, the NOx reduction efficiency was 95.8%, and the $NH_3$ reduction efficiency, calculated based on the amount of excess ammonia, was 78.2%.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of treating a stream of gases containing oxides of nitrogen, carbon monoxide and hydrocarbons, the method comprising:
   injecting ammonia into the gas stream to beyond a stoichiometric concentration with the oxides of nitrogen; then
   reducing oxides of nitrogen by passing the gas stream over a reducing catalyst; and then
   oxidizing carbon monoxide, hydrocarbons and ammonia while simultaneously further reducing oxides of nitrogen by passing the gas stream over a reducing-plus-oxidizing catalyst.

2. The method of claim 1, further comprising injecting the ammonia in a quantity sufficient to achieve a molar ratio of ammonia to oxides of nitrogen to between 1.05:1 and 1.2:1.

3. The method of claim 1, further comprising providing the reducing catalyst and the reducing-plus-oxidizing catalyst as a monolithic multifunction catalytic element comprising an upstream reducing-only portion and a downstream reducing-plus-oxidizing portion.

4. The method of claim 1, further comprising beginning to oxidize carbon monoxide, hydrocarbons and to decompose ammonia prior to the reducing step by passing the gas stream over an oxidizing catalyst that provides for a lower level of oxidizing activity than does the reducing-plus-oxidizing catalyst.

5. The method of claim 1, further comprising beginning to oxidize carbon monoxide, hydrocarbons and to decompose ammonia simultaneously with the reducing step by impregnating the reducing catalyst with a concentration of oxidizing catalyst material that is less than a concentration of oxidizing catalyst material contained in the reducing-plus-oxidizing catalyst.

6. A method of treating an exhaust stream to reduce a concentration of oxides of nitrogen in the exhaust stream, the method comprising:
   injecting a reducing agent into the exhaust stream to beyond a stoichiometric concentration with the oxides of nitrogen; and
   bringing the reducing agent-containing exhaust stream into contact with a multifunction catalytic element comprising an upstream reducing-only portion and a downstream reducing-plus-oxidizing portion.

7. The method of claim 6, wherein the step of injection comprises injecting ammonia in a quantity sufficient to achieve a molar ratio of ammonia to oxides of nitrogen of between 1.05:1 and 1.2:1.

8. The method of claim 6, further comprising providing the upstream reducing-only portion and the downstream reducing-plus-oxidizing portion on a common monolithic substrate.

9. The method of claim 6, further comprising providing a reducing catalyst material in the downstream reducing-plus-oxidizing portion that is different than a reducing catalyst material of the upstream reducing-only portion.

10. A method of treating an exhaust stream to reduce a concentration of oxides of nitrogen, carbon monoxide and hydrocarbons in the exhaust stream, the method comprising:
    injecting ammonia into the exhaust stream; and
    bringing the ammonia-containing exhaust stream into contact with a multifunction catalytic element comprising an upstream portion comprising a first reducing catalyst material and a first concentration of an oxidizing catalyst material and a downstream portion comprising a second reducing catalyst material and a second concentration of an oxidizing catalyst material, the second concentration being greater than the first concentration.

11. The method of claim 10, further comprising injecting the ammonia to beyond a stoichiometric concentration with the oxides of nitrogen.

12. The method of claim 10, wherein the first reducing catalyst material and the second reducing catalyst material comprise the same material.

13. The method of claim 10, wherein the upstream portion and the downstream portion are formed as a monolithic structure.

14. The method of claim 10, further comprising forming the upstream portion to comprises 10-90% of the multifunction catalytic element volume.

15. A power generating apparatus comprising:
a gas turbine engine for combusting a fuel in air to produce shaft power and a flow of exhaust gases comprising oxides of nitrogen, carbon monoxide and hydrocarbons;
a treatment apparatus for receiving the exhaust gases prior to passing the exhaust gases to atmosphere, the treatment apparatus comprising:
an ammonia injection apparatus for injecting ammonia into the exhaust gases to beyond a stoichiometric concentration with the oxides of nitrogen; and
a multi-function catalytic element disposed downstream of the ammonia injection apparatus and comprising an upstream reducing portion and a downstream reducing-plus-oxidizing portion.

16. The apparatus of claim 15, wherein the reducing portion and the reducing-plus-oxidizing portion are formed as a monolithic structure.

17. The apparatus of claim 15, further comprising a reducing catalyst material of the reducing portion being a material different that a reducing catalyst material of the reducing-plus-oxidizing portion.

18. The apparatus of claim 15, further comprising:
the ammonia injecting apparatus selected to inject the ammonia in a quantity sufficient to achieve a molar ratio of ammonia to oxides of nitrogen in the exhaust stream to between 1.05:1 and 1.2:1; and
the multi-function catalytic element effective to limit the ammonia slip to below 2 ppm.

19. The apparatus of claim 15, wherein the reducing portion of the multi-function catalytic element comprises 10-90% of a total volume of the catalytic element.

20. The apparatus of claim 15, further comprising an oxidizing catalyst function disposed upstream of the reducing-plus-oxidizing portion.

21. The apparatus of claim 20, wherein the oxidizing catalyst function comprises an oxidizing catalyst material impregnated into the upstream reducing portion of the multi-function catalytic element.

22. The apparatus of claim 20, wherein the oxidizing catalyst function comprises an oxidizing catalyst element disposed upstream of the multi-function catalytic element.

* * * * *